T. RUSTAD.
LAND CLEARING MACHINE.
APPLICATION FILED OCT. 29, 1907.
934,363.
Patented Sept. 14, 1909.
3 SHEETS—SHEET 1.
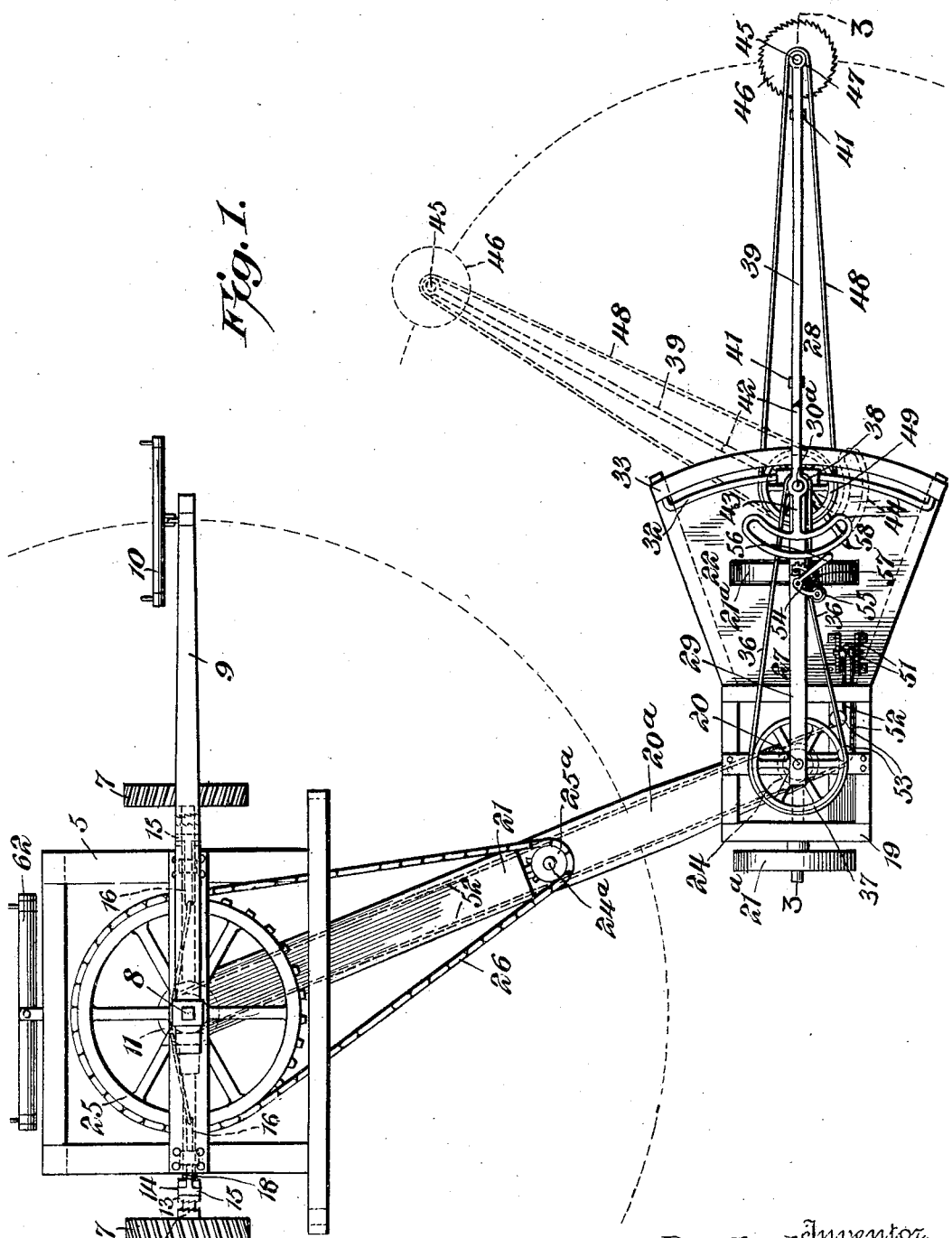
Witnesses
Howard D. Orr
B. G. Foster
Thor Rustad, Inventor,
By E. G. Siggers
Attorney T. RUSTAD.
LAND CLEARING MACHINE.
APPLICATION FILED OCT. 29, 1907.
934,363.
Patented Sept. 14, 1909.
3 SHEETS—SHEET 2.
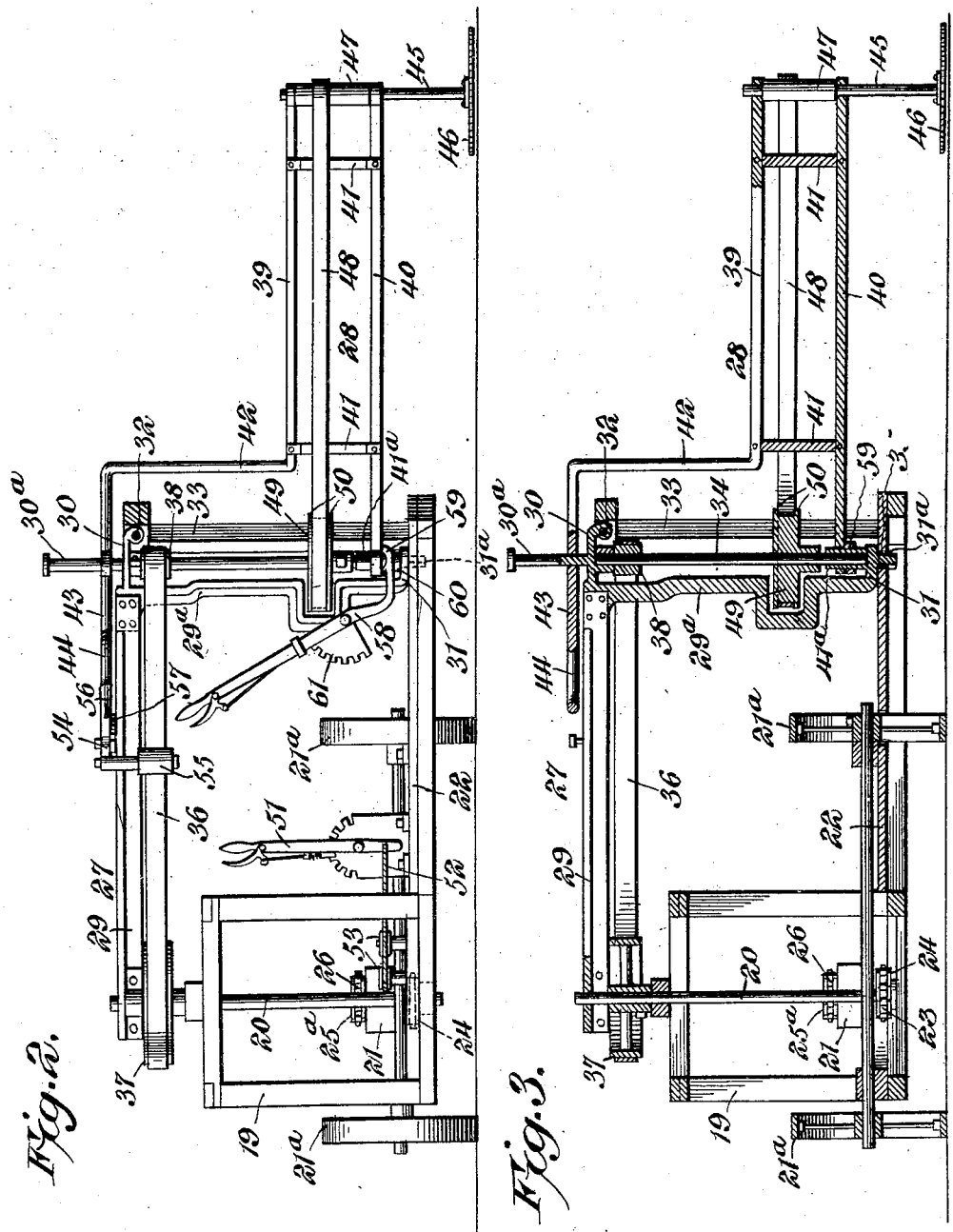
Witnesses
Howard D. Orr
B. G. Foster
Thor Rustad, Inventor,
By C. G. Siggers
Attorney T. RUSTAD.
LAND CLEARING MACHINE.
APPLICATION FILED OCT. 29, 1907.
934,363.
Patented Sept. 14, 1909.
3 SHEETS—SHEET 3.
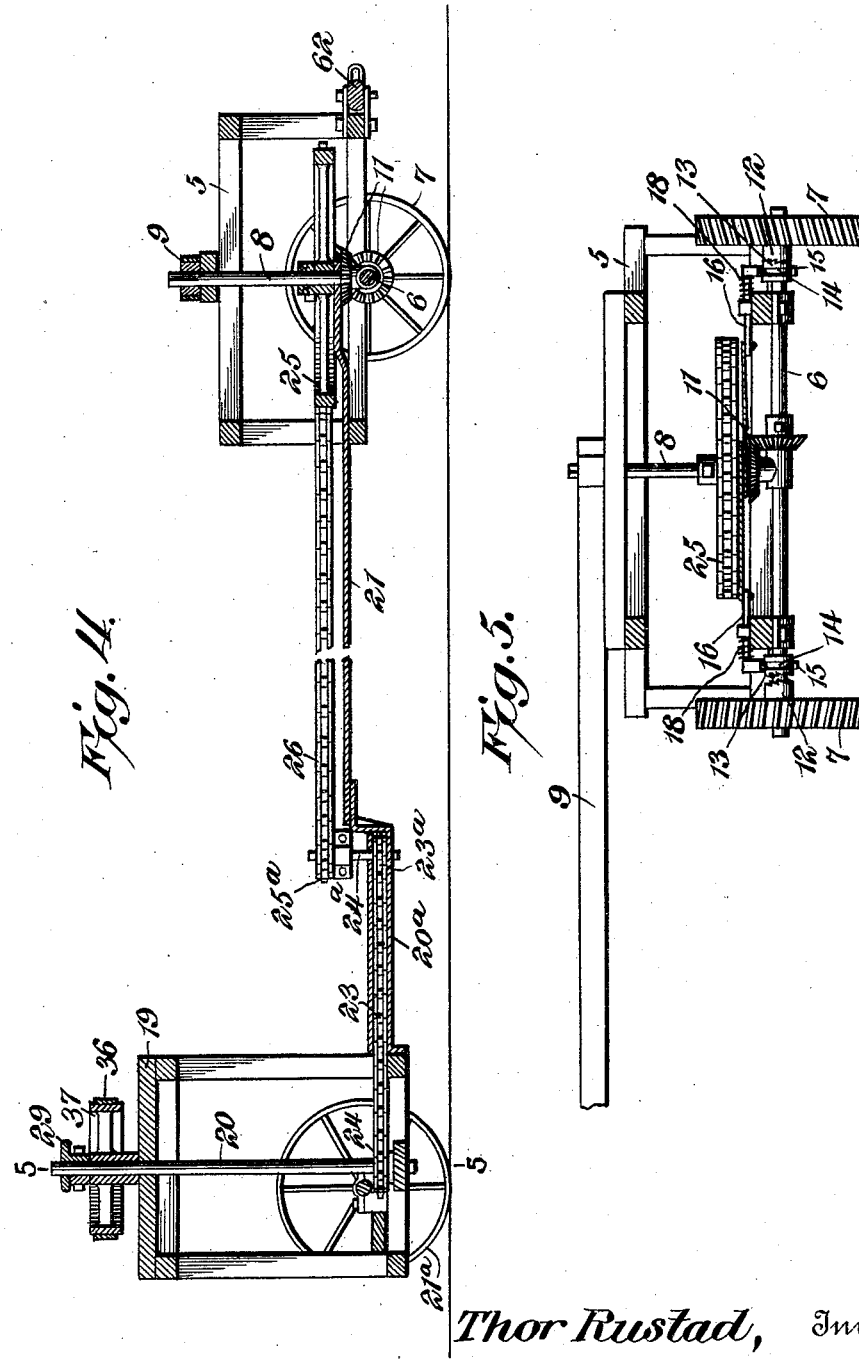
Thor Rustad, Inventor,
Witnesses
Howard D. Orr.
By C. G. Siggers.
Attorney

UNITED STATES PATENT OFFICE.

THOR RUSTAD, OF ERSKINE, MINNESOTA, ASSIGNOR OF ONE-HALF TO ANDREW P. VOLLOM, OF MINNEAPOLIS, MINNESOTA.

LAND-CLEARING MACHINE.

934,363.  Specification of Letters Patent.  Patented Sept. 14, 1909.

Application filed October 29, 1907. Serial No. 399,766.

*To all whom it may concern:*

Be it known that I, THOR RUSTAD, a citizen of the United States, residing at Erskine, in the county of Polk and State of Minnesota, have invented a new and useful Land-Clearing Machine, of which the following is a specification.

New land, from which the trees have been recently cut, cannot be successfully sown with the grain, for the reason that the stumps and brush prevent the use of harvesting machines, and as a consequence, corn and crops of a similar character are not usually planted until the stumps have rotted away.

The primary object of the present invention is to provide a novel and simple machine which will cut off stumps, brush and the like even with the surface of the ground, thus eliminating obstructions to the use of harvesters, so that grain may be raised on new land.

Another and important object is to provide a machine of this character that can be propelled from point to point and has a saw movable to a variety of positions in order that stumps of various shapes and in various places can be cut.

The preferred embodiment of the invention is illustrated in the accompanying drawings, wherein:—

Figure 1 is a top plan view of the machine. Fig. 2 is a rear elevation of the rear portion of the same. Fig. 3 is a sectional view on the line 3—3 of Fig. 1. Fig. 4 is a sectional view through the machine. Fig. 5 is a sectional view on the line 5—5 of Fig. 4.

Similar reference numerals designate corresponding parts in all the figures of the drawings.

In the embodiment illustrated, a front supporting frame 5 is employed having a rotatable axle 6, on which ground and propelling wheels 7 are loosely journaled. An upright driving shaft 8 is journaled on the frame and is operated from any suitable source of power. For instance in the present embodiment, a horse power is employed, comprising a sweep 9 secured to the upper end of the shaft and having a suitable whiffletree 10 passed through its outer end. Instead of this arrangement, an engine mounted on the frame 5 may be employed, as will be evident. The lower end of the driving shaft 8 is geared, as shown at 11 to the axle 6, so that as long as the driving shaft is in operation, the axle will be rotated. The wheels being loose thereon, are, however, not driven, but either or both may be clutched to said axle, and to this end, clutches are employed comprising members 12 and 13, one of the members of each clutch being secured to a wheel, the other being feathered upon the axle and having an annular groove 14 engaged by the forked end 15 of an actuating device 16, slidably mounted on the frame 5. Springs 18, engaged with the devices, serve to normally maintain the clutch members 13 out of coaction with the clutch members 12. Another supporting frame 19 is located in rear of the supporting frame 5, and journaled thereon is an upright shaft 20. The two supporting frames are connected by a reach 21 that is pivoted to the front frame and rigidly fastened to the rear frame. This reach has a downset rear section 20$^a$ located adjacent to the rear frame 19 and in the form of a casing, the same being low enough to permit animals to pass freely thereover. The rear frame 19 is supported by suitable ground wheels 21$^a$, and has a platform 22 located at one side of the same. The vertical shaft 20 is driven from the shaft 8 and to this end, a sprocket chain 23 passes around a sprocket wheel 24 on the shaft 20 and around a sprocket wheel 23$^a$ on an intermediate idler shaft 24$^a$ having another sprocket wheel 25$^a$. Another sprocket chain 26 passes around the wheel 25$^a$ and around a large sprocket wheel 25 fixed to the driving shaft 8. These chains extend longitudinally of the reach, and the rear chain is covered by the casing section 20$^a$ over which the draft animals travel in their rotation, as will be noted by reference to Fig. 1.

A saw supporting frame is pivotally mounted on the rear supporting frame 19 and comprises sections 27 and 28. The inner section 27 consists of an upper horizontal bar 29 pivoted on the upper end of the shaft 20, and having an upright bracket 29$^a$ at its outer end. This bracket has upper and lower ears 30 and 31, the upper ear being slidably mounted on a curved guide rod 32 secured to an upright portion 33 of the supporting frame. A vertical shaft 34 is journaled in the ears 30 and 31 of the bracket 29$^a$. The lower end of this bracket has a depending guide plate 31$^a$ operating in a curved slot 35 formed in the platform 22, and the upper end of the bracket has an upstanding stem 30ᵃ. The shaft 34 is driven by a belt 36, which operates around pulleys 37 and 38 secured respectively to the shafts 20 and 34. The outer frame section 28 consists of upper and lower bars 39 and 40 connected by cross pieces 41 and respectively pivoted at their inner ends on the stem 30ᵃ and a sleeve 41ᵃ surrounding the lower end of the shaft 34, said bars and consequently the frame sections being movable vertically on the bracket. The upper bar 39 has an upwardly extending portion 42 and a rearwardly extending portion 43 that terminates in a curved handle 44. On the outer end of the frame section 28 is journaled an upright shaft 45 that carries at its lower end a circular saw 46 located wholly below the frame. A comparatively long pulley 47, fixed to the shaft 45 between the frame bars 39 and 40, is connected by a belt 48 to another pulley 49, fixed to the shaft 34, the latter pulley being provided with flanges 50.

The operator of the machine is stationed on the platform 22, and in order that he may control the various operations of the same, the controlling devices are located upon or adjacent to said platform. Thus the means for operating the clutches 12—13 are in the form of levers 51 mounted on said platform and connected by cables 52 with the rear ends of the devices 16, said cables passing around suitable pulleys 53. For the purpose of controlling the operation of the saw, a belt tightener is employed in the form of a bell crank lever 54 that is journaled on the upper bar 29 of the inner frame section 27, said lever having on one arm a roller 55 that bears against the belt 36, the other arm constituting a handle 56, and having a suitable dog coöperating with a rack 57. The handle 44 is located directly on the platform 22 as shown, and for the purpose of raising and lowering the outer frame section 28 and consequently the saw 46, a lever 58 is mounted on the bracket 29ᵃ and has a forked end 59 that bears against the lower bar 40 of the frame section 28. For the purpose of holding the lever in different positions, a suitable dog is mounted on said lever, and coöperates in a manner well understood with a quadrant rack 61.

The operation of the machine is substantially as follows: The shaft 8, driven by animal or mechanical power, is continuously rotated, and if the belt 36 is tightened, it will be evident that the saw 46 will be revolved. An operator located on the platform 22 can direct this saw to a number of positions with respect to the frame, for the outer section 28 may be swung with respect to the inner section 27, or both sections can be moved together. Thus stumps can be cut on different sides, and if necessary, the saw can be raised or lowered by operating the lever 58. If it is desired to move the machine forwardly, it is only necessary to throw in both of the clutches 12—13, and as this will connect the wheels 7 to the rotating axle, it will be evident that the machine will be propelled. In this case, the animals will travel in a spiral path. To turn toward one side or the other, one or the other of the clutches is thrown in, while the other is left out. If the machine is to be transported from one field to another, the animals may be hitched directly to the front frame 5, a suitable whiffletree 62 being provided for this purpose, or the sweep can be employed as a pole or draft device.

From the foregoing, it is thought that the construction, operation, and many advantages of the herein described invention will be apparent to those skilled in the art without further description, and it will be understood that various changes in the size, shape, proportion, and minor details of construction, may be resorted to without departing from the spirit or sacrificing any of the advantages of the invention.

Having thus fully described my invention, what I claim as new, and desire to secure by Letters Patent, is:—

1. In a machine of the character set forth, the combination with a supporting frame having spaced journal boxes, of a shaft journaled in the boxes, a stem projecting from the supporting frame in line with the shaft, a swinging frame journaled on one of the boxes and on the stem, a saw mounted on the frame, and driving connections between the shaft and saw.

2. In a machine of the character set forth, the combination with a supporting frame having journal boxes, of a shaft journaled in the boxes, a stem projecting from the frame at one side of the shaft and in line therewith, a swinging frame journaled on one of the boxes and on the stem and being slidable on the same longitudinally of the shaft, means for swinging the frame, means for sliding the frame, a saw rotatably mounted on the frame, and driving connections between the shaft and saw.

3. In a machine of the character set forth, the combination with a support including a platform for an operator, of a vertical shaft mounted on the support, a swinging frame comprising upper and lower bars journaled upon the support concentrically to the shaft, the upper bar having a rearwardly extending handle located adjacent to the platform, an upright shaft journaled on the outer end of the swinging frame, a horizontally disposed circular saw fixed to the lower end of the shaft below the frame, driving connections between the shafts, and a lever fulcrumed on the support adjacent to the platform and having a connection with the lower bar of the frame for moving said frame vertically.

4. In a machine of the character set forth, the combination with a support, of an inner frame section pivotally mounted at one end thereon, means carried by the support and slidably engaging the other end of the frame section to guide the same in its movement, and an outer saw carrying frame section pivoted to the guided end of the inner section.

5. In a machine of the character set forth, the combination with a support including a platform for an operator, of an inner frame section pivotally mounted at one end on the support and including a bracket, upper and lower guiding means carried by the support and slidably engaged by the inner section, an outer frame section adjustably connected to the guided end of the inner section, means for relatively adjusting the sections, and a saw mounted on the outer section.

6. In a machine of the character set forth, the combination with a support, of an inner frame section pivotally mounted thereon, an outer frame section pivotally mounted on the inner section and vertically movable thereon, means mounted on one section adjacent to the support and engaging the other section for effecting the vertical movement of the outer section on the inner section, a saw journaled on said outer section, and driving means for the saw.

7. In a machine of the character set forth, the combination with a support, of an upright driving shaft journaled thereon, an inner swinging frame section mounted on the support and including a bracket, guiding means for the bracket mounted on the support, an upright shaft journaled in the bracket, an outer frame section pivoted on the bracket and movable longitudinally thereof in an upright direction, an upright shaft journaled on the outer end of the outer bracket section, a horizontally disposed circular saw fixed to the lower end of the shaft, driving connections between the various shafts, and means for effecting the relative swinging movements of the frame sections.

8. In a machine of the character set forth, the combination with a support having a curved slot and a curved guide rod above the slot, of a swinging frame section pivoted on the support, said section having upper and lower guide elements respectively engaged with the rod and in the slot, a saw adjustably mounted on the frame section, and means for driving the saw.

9. In a machine of the character set forth, the combination with a frame including a guide, of ground wheels for the frame, a driving shaft having a sprocket wheel, an axle for the ground wheels having a gear connection with the driving shaft, means for clutching either or both wheels to the axle, another frame, wheels for supporting the latter frame, a reach pivoted to one of the frames and connected to the other, an upright shaft journaled on the latter frame and having a sprocket wheel, sprocket chain connections between the said sprocket wheel and the sprocket wheel of the driving shaft, a casing covering a portion of the chain connections, a sweep fixed to the driving shaft, a swinging support mounted on the latter frame and comprising relatively movable sections, a saw journaled on the outer section, driving connections between the shaft of the latter frame and the saw, a platform carried by the first mentioned frame, means associated with the platform for controlling the movement of the swinging support, and means associated with the platform and extending along the reach for controlling the operation of the clutching means.

In testimony, that I claim the foregoing as my own, I have hereto affixed my signature in the presence of two witnesses.

THOR RUSTAD.

Witnesses:
 E. O. MELSNESS,
 C. O. MELSNESS.